3,455,899
PRODUCTION OF LOW ODOR, LOW TASTE
GALACTOMANNAN GUMS
James L. Keen, New Brighton, Minn., assignor to General
Mills, Inc., a corporation of Delaware
No Drawing. Filed Aug. 1, 1966, Ser. No. 569,067
Int. Cl. C08b 19/00
U.S. Cl. 260—209                                             8 Claims

ABSTRACT OF THE DISCLOSURE

A process for the production of low odor, low taste galactomannan gums wherein the galactomannan splits are treated with steam thereby raising the temperature of the splits to the temperature of the steam and removing odors and tastes. The low odor, low taste gums are useful as thickeners in foods.

---

This invention relates to the process of preparing a low odor and low taste galactomannan gum, and in particular, to an improvement in the conventional process wherein galoctamanan splits are tempered, flaked, dried, and ground into gum, the improvement consisting in the treatment of the splits with steam prior to the flaking, drying, and grinding.

Galactomannan gums such as guar gum and locust bean gum, which are the most common, are useful as stabilizers and thickeners in foods, cosmetics, and similar high quality products. However, present milling processes usually produce a guar gum which has an objectionable "beany" odor when prepared in dilute solutions of sols. This odor and corresponding taste severely limits the use of the gum in foods, cosmetics, and the like.

One method of preparing galactomannan gums is seen in U.S. Patent 2,891,050 in which method the endosperm sections, commonly called "splits," are tempered, flaked, dried, and ground into guar gum. It has now been discovered that significant improvement in the odor and taste of the final product results if the endosperm sections or splits are treated with steam prior to the flaking, drying, and grinding, preferably during or just after the tempering step. The splits are preferably treated for a sufficient time to raise the splits to the steam temperature. The length of steaming is determined by the odor level which can be tolerated in the final gum product.

One method of obtaining the gum splits or endosperm is described in U.S. Patent 3,132,681. The splits is that part of the seed which is substantially free from germ and hull. In the conventional treatment, such splits would be treated as described in U.S. Patent 2,891,050 wherein the splits are tempered preferably to a moisture content in the range of 30–60% by weight of water followed by flattening of the endosperm while in this wet or softened condition (flaking). The flaked product is subsequently dried and ground to produce the resulting finely ground product. In the present method, "live" steam is introduced into the mass of splits, preferably during tempering, so as to bring the temperature of the mass of splits substantially up to the temperature of the steam (preferably about 100° C.) to provide a milled gum product with little or no characteristic odor. A convenient method of doing this is to introduce steam into the container in which the moist, particulate, and tempering splits are being mixed. When the splits have substantially reached steam temperature (about 90–110° C.), excess steam is allowed to exhaust to the atmosphere. At this point, the hot tempered splits can be promptly flaked. The length of steaming is dependent on the odor level which can be tolerated in the final product. It is preferable that the steaming continue for a period of time after reaching steam temperature prior to flaking and further processing. Preferably, this time of steaming after the mass of splits has reached the steam temperature will be at least five minutes and will not exceed about one hour. Longer time periods may be employed, however, if desired. Preferably, the splits are tempered in steam to the moisture level desired for flaking, which is ordinarily between 30–60% by weight of water with an optimum at about 48% moisture content by weight. Optionally, the splits may be washed prior to steaming as a further aid to lower odor levels. However, washing of the splits alone is insufficient and the bulk of odor reduction occurs during the steaming operation. In addition, mere tempering of the splits in water, without steaming, is insufficient.

While reference has been made to U.S. Patent 3,132,681 for obtaining the endosperm, any other method providing endosperm splits may be employed. Essentially any endosperm sections or splits, relatively free from germ and hull, may be employed. While the present invention is particularly applicable to the method described in U.S. Patent 2,891,050 wherein endosperm splits are tempered, flaked, dried and ground, any other method of providing finely divided gum products may be employed. For the details of the specific flaking, drying and grinding of the product, reference is made to U.S. Patent 2,891,050 and it is understood that the details in the subsequent steps of flaking, drying, and grinding do not form a part of the invention herein.

This invention is applicable where any odor or taste problems exist with galactomannan gums such as locust bean gum, guar gum, paloverde, flametree, and tara gum. Such problems exist particularly with guar gum and the invention is particularly applicable thereto. Such gums upon hydrolysis provide the two sugars, galactose and mannose, and accordingly, are commonly referred to as galactomannans or polygalactomannans. The invention can best be illustrated by reference to the following specific examples.

Example I

Five hundred g. of high quality guar splits were well mixed with 440 cc. of water in a glass par for several minutes until the water was taken up. The splits were allowed to temper until they could be used, about an hour. They were then flaked, dried, and ground in a laboratory system to be a control material. Another 500 g. of splits was mixed with 325 cc. of water in a glass jar until the water was taken up. The jar containing the moist splits was then placed in a special revolving holder so that steam could be introduced into the mass of mixing splits through a small plastic tubing. Steam was introduced for about 30 minutes, at such a rate that only 2–3 minutes were required to bring the mass of splits to near 95° C. At the end of the steaming period, the splits were flaked, dried, and ground in a laboratory system.

The two samples described above, along with a sample of commercial guar gum, were prepared in 1% sols in sealed jars.

Several individuals were requested to smell and taste the prepared sols. The steamed material was picked as having no odor at all or less odor than unsteamed or commercial gum which did have a beany odor. Taste tests were not as conclusive although those which did note a taste indicated the steamed material had the least taste.

Example II

Using the general techniques outlined in Example I, five products with various steaming times were prepared. Seven individuals were requested to evaluate the odor of sols made from five products rating the product 1 to 5, with #1 having the least odor and #5 the most.

The table shows the results:

| Tester | Sample 1, no steaming | Sample 2, steamed to 95° C. | Sample 3, steamed 5 min. | Sample 4, steamed 15 min. | Sample 5, steamed 30 min. |
|---|---|---|---|---|---|
| A | 4 | 5 | 3 | 1.5 | 1.5 |
| B | 4 | 5 | 3 | 1.5 | 1.5 |
| C | 3 | 4 | 5 | 1.5 | 1.5 |
| D | 5 | 4 | 1.5 | 3 | 1.5 |
| E | 4.5 | 4.5 | 2 | 2 | 2 |
| F | 5 | 4 | 3 | 2 | 1 |
| G | 4 | 3 | 5 | 2 | 1 |
| Average | 4.2 | 4.2 | 3.2 | 1.9 | 1.4 |

The embodiments of the invention in which an exclusive property or privilege is claimed are defined as follows:

1. In a process for the production of low odor and low taste galactomannan gum products from endosperm sections composed largely of galactomannans the improvement which comprises treating said endosperm sections with steam at about 90–110° C. for up to 1 hour after said endosperm sections have substantially reached the temperature of said steam.

2. A process as defined in claim 1 in which said galactomannan gum is selected from the group consisting of locust bean gum and guar gum.

3. A process as defined in claim 1 wherein said treatment is conducted for a period of 5 minutes–1 hour after said steam temperature is reached.

4. In a process for the production of mucilaginous material from leguminous seeds, the endosperm sections of which are composed largely of galactomannans which comprises tempering said endosperm sections, flattening said endosperm, drying and grinding the flattened endosperm, the improvement consisting essentially of treating with steam at about 90–110° C. said endosperm sections prior to flaking, drying, and grinding, for up to 1 hour after said endosperm sections have substantially reached the temperature of said steam.

5. A process as defined in claim 4 wherein said treatment with steam is conducted simultaneously with said tempering.

6. A process as defined in claim 4 wherein said treatment of steam is conducted subsequent to said tempering.

7. A process as defined in claim 4 in which said endosperm sections are tempered and steamed to a moisture level in the range of about 30–60% by weight of water.

8. A process as defined in claim 4 wherein said galactomannan is selected from the group consisting of locust bean gum and guar gum.

References Cited
UNITED STATES PATENTS
2,891,050  6/1959  Elverum et al. _____ 260—209
3,226,378  12/1965  Wilson _____ 260—209

LEWIS GOTTS, Primary Examiner

J. R. BROWN, Assistant Examiner